Patented June 12, 1928.

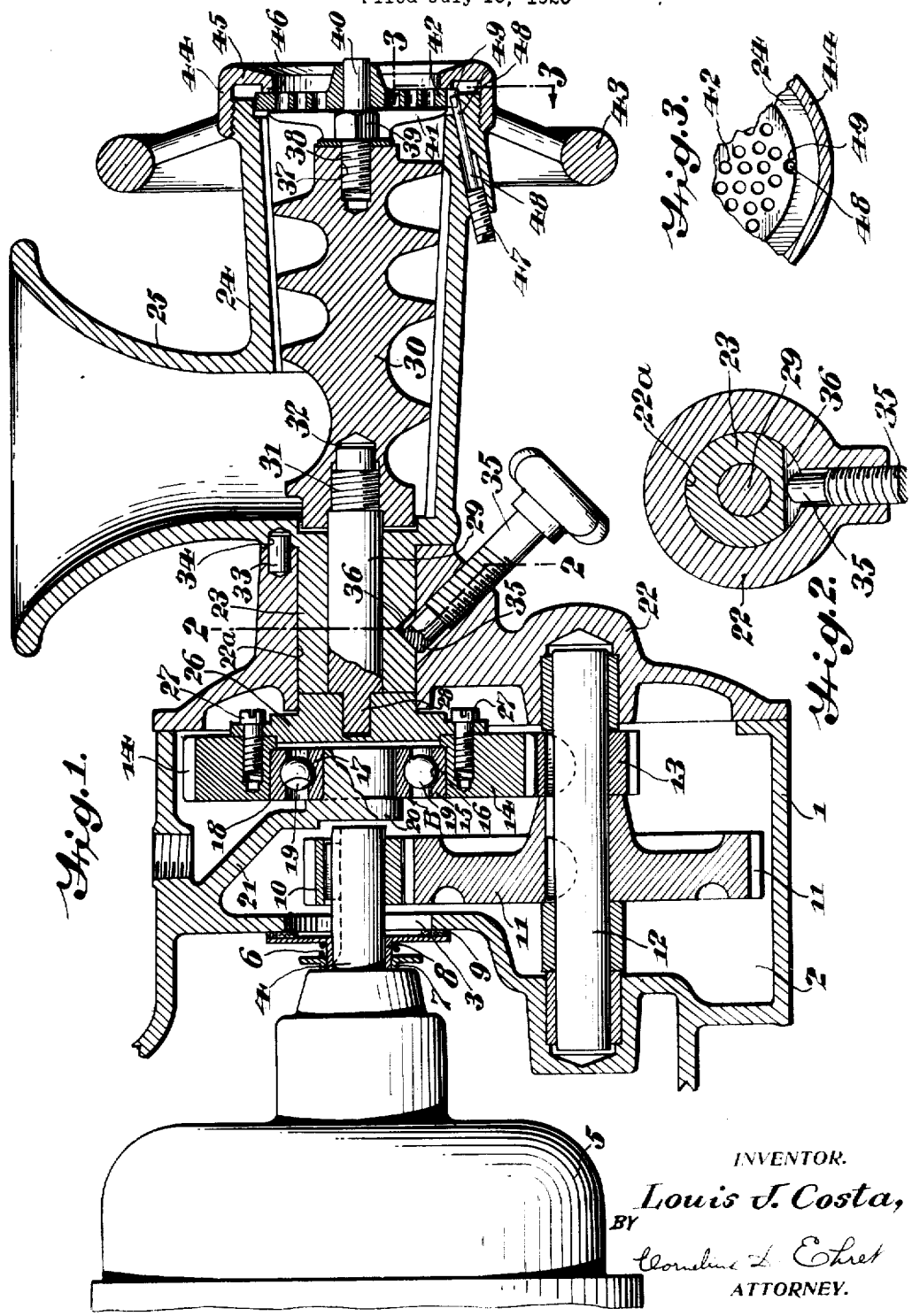

1,673,229

UNITED STATES PATENT OFFICE.

LOUIS J. COSTA, OF PHILADELPHIA, PENNSYLVANIA.

GRINDING MACHINE.

Application filed July 16, 1925. Serial No. 43,918.

My invention relates to apparatus, preferably power driven, utilizable for grinding, cutting, or performing a like operation on meat, fruits, or similar substances.

In accordance with my invention, the back thrust of the worm which feeds a substance, as aforesaid, to a grinder or cutter is transmitted to a combined end thrust-radial thrust bearing located in a chamber separate and removed from the feeding and cutting chamber.

Further in accordance with my invention, a chamber containing suitable speed-reducing gearing lubricated by the well known "splash" system also contains a bearing of the character aforesaid, a rib extending transversely of the chamber serving to deflect lubricating material onto the anti-friction members of the bearing.

Further in accordance with my invention, an elongated pin having an end engaging and holding an element of the grinding or cutting mechanism in stationary position may be shifted toward the element to present a new surface thereto should fracture of the pin occur.

My invention resides in apparatus of the character hereinafter described and claimed.

For an illustration of one of the forms my invention may take, reference is to be had to the accompanying drawing, in which:

Fig. 1 is a vertical sectional view of apparatus embodying my invention.

Fig. 2 is a sectional view on the line 2—2 of Fig. 1.

Fig. 3 is a sectional view on the line 3—3 of Fig. 1 looking in the direction of the arrows.

Referring to the drawing, the supporting stand 1, preferably a hollow casting, forms a closed chamber 2 receiving a quantity of suitable fluid for lubricating the gears and other instrumentalities, hereinafter described. An opening 3 in the supporting stand receives a shaft 4 driven by a suitable source of power, as the electric motor 5. A coiled spring 6 bearing against the flanged portion of a collar 7 rigidly secured to the frame of the motor 5 co-operates with a similar flanged portion of a collar 8 slidable on the shaft 4 to hold a felt washer 9, or equivalent, in close fitting engagement with the supporting stand 1, adjacent, and concentric with respect to the opening 3. In this manner, leakage of the lubricating fluid through the opening 3 is prevented.

A gear 10 keyed to shaft 4 meshes with a gear 11 keyed to a shaft 12 rotatable in a bearing in the supporting stand 1 and in a frame hereinafter described. A gear 13 spaced from gear 11 and likewise keyed to shaft 12 meshes with a gear 14 rigidly secured to one element of a combined and thrust-radial thrust bearing designated generally at B.

Bearings of this character are well known in the art and usually comprise an outer collar 15 having a race 16 disposed on its interior surface and an inner collar 17 having a race 18 disposed on its exterior surface, the races receiving and retaining suitable antifriction members, as the balls 18. As utilized in the present instance, gear 14 is rigidly secured to collar 15, while the co-operating collar 17 is rigidly secured to a stud 20 formed integrally with a rib 21 of the supporting stand 1, the rib also serving to deflect lubricating material on to the collars 15 and 17 and balls 18.

A frame 22 secured to the supporting stand 1 by bolts, or equivalent (not shown), forms one bearing for the shaft 12 and is provided with an opening 22$^a$ in axial alignment with the shaft 4 for the reception of an extension 23 of the grinder casing 24 provided with the inlet port 25. A coupling plate 26 having a slight clearance with frame 22 suitably secured to gear 14, as by screws 27, is slotted to receive the shank 28 of a shaft 29 rotatably mounted in the extension 23. Shaft 29 is secured to the worm 30 in any suitable manner, preferably by threading the end thereof, as at 31, and effecting engagement with the correspondingly threaded socket 32 in the worm. It is to be understood that these threads are pitched in a sense opposite to the pitch of the worm, and, accordingly, normal rotation of the worm tends to tighten its connection with the shaft 29. Further, it is to be understood that the end of the worm 30 when in operative position does not frictionally engage the end of the extension 23, and, accordingly, the back thrust of the worm is not taken by this member, as is common in the prior art constructions.

The grinder casing 24 is properly positioned with respect to the frame 22 by a pin 33 received in a socket 34 in the grinder casing. A screw 35 threaded into the frame 22 at an angle thereto engages a notch 36 formed in the extension 23 to move it into proper position in the opening 22ᵃ of the frame 22. When the worm 30 is moving a substance toward the grinding or cutting apparatus, the thrust of the worm toward the left (Fig. 1) is transmitted through the shaft 29, plate 26 and extension 23 to the screw 35, and consequently is not entirely taken by the grinding and cutting apparatus.

Worm 30 at its end remote from the shaft 29 has a threaded socket 37 receiving a threaded pin or stud 38 having a rectangular portion 39 and a cylindrical portion 40. As was the case with the threaded connection at the other end of the worm, the pitch of these threads should be opposite to the pitch of the worm. A cutting knife 41 fits over the rectangular portion 39 of pin 38 and rotating with the worm cooperates with a perforated disk 42 slidable on the cylindrical portion 40 of said pin 38 and held stationary with respect to the cutting knife, as hereinafter described. The disk 42 is held in intimate engagement with knife 41 by a wheel 43 threaded to the grinder casing 24, said wheel having a hub 44 provided with a flange 45 having an extension 46 parallel with the hub engaging said disk. A pin 47 threaded into the grinder casing 24 is provided with a reduced portion 48 entering a slot or hole 49 in the disk 42.

It will be observed that the reduced portion 48 of pin 47 retains disk 42 stationary with respect to the cutting knife 41. If for any reason the end of the pin should be broken, a screw driver may be applied to pin 47 and the unbroken end of the reduced portion 48 moved into the notch 49. Pin 47, therefore, is in effect a "magazine pin".

It will also be observed that rotation of wheel 43 in the proper direction will move extension 46 against disk 42 to effect close-fitting, frictional engagement between said disk and the cutting knife 41. Heretofore, an adjustment of this character has been effected by moving a member, such as the flange 45, into engagement with the disk 42. After a time, the thickness of members such as the knife 41 and disk 42 becomes materially reduced, and, therefore, it often happens that a member such as the flange 45 engages the end of the grinder casing before the cutting elements are properly located. However, with my invention, since the extension 46 may pass within the end of the grinder casing 24, a degree of adjustment, not possible with the prior art devices, may be secured.

Further, it will be observed that movement of wheel 43, as aforesaid, places an axial thrust upon the worm 30, and this thrust is transmitted to the combined end thrust-radial thrust bearing mounted in the chamber formed by the supporting stand 1 and frame 22. This bearing is mounted in a chamber effectually sealed from the feeding and cutting chamber, and, accordingly, its parts may be maintained in satisfactory working condition.

What I claim is:

1. Grinding apparatus comprising a casing, a combined end thrust-radial thrust bearing comprising fixed and movable members mounted therein, anti-friction members disposed between said fixed and movable members, a gear carried by said movable member, a grinder casing, a worm rotatable therein, and rotatable structure intervening between said worm and gear whereby through the agency of said gear the back thrust on the worm is transmitted to said bearing.

2. Grinding apparatus comprising a casing, a rib formed integrally therewith, a stud carried by said rib, a combined end thrust-radial thrust bearing mounted thereon, a grinder casing, a worm rotatable therein, and structure intervening between said worm and bearing whereby the back thrust on the worm is transmitted to said bearing.

3. Grinding apparatus comprising a casing, a rib formed integrally with said casing and extending transversely thereof, a stud carried by said rib, a combined end thrust-radial thrust bearing mounted thereon, a gear carried by said bearing, a grinder casing, a worm rotatable therein, and rotatable structure intervening between said worm and bearing.

4. Grinding apparatus comprising a casing, a rib formed integrally with said casing and extending transversely thereof, a stud carried by said rib, a combined end thrust-radial thrust bearing mounted thereon, a gear carried by said bearing, a grinder casing, a worm rotatable therein, and rotatable structure comprising said gear intervening between said worm and bearing.

5. Grinding apparatus comprising a casing, a stud connected thereto, a combined end thrust-radial thrust bearing comprising fixed and movable ring-shaped members, said stud being received by the aperture in said fixed member, a gear carried by said movable member, a grinder casing, a worm rotatable therein, and means comprising a coupling plate detachably secured to said gear for effecting connection thereof with said worm.

6. Grinding apparatus comprising a casing containing lubricating fluid, an anti-friction bearing mounted therein, an inclined rib extending transversely of the casing adjacent said bearing, means associated with said bearing for depositing lubricating fluid on said rib from which it passes to said bearing, a grinder casing, and a worm therein operatively connected with said bearing.

7. Grinding apparatus comprising a casing, a combined end thrust-radial thrust bearing, comprising fixed and movable members mounted therein, anti-friction members disposed between said fixed and movable members, a stud formed integrally with said casing for supporting said fixed member, a gear carried by said movable member, means for rotating said gear, a grinder casing, and a worm rotatable therein connected to the movable member of said bearing.

8. Grinding apparatus comprising a casing, a combined end thrust-radial thrust bearing comprising fixed and movable members mounted therein, a gear carried by said movable member, means for rotating said gear, a grinder casing, a worm rotatable therein connected to the movable member of said bearing, and anti-friction structure comprised in said bearing and disposed between said fixed and movable members adapted to receive the end thrust of said worm and radial thrust having as a component the radial thrust of said gear rotating means.

In testimony whereof I have hereunto affixed my signature this 15th day of July, 1925.

LOUIS J. COSTA.

CERTIFICATE OF CORRECTION.

Patent No. 1,673,229.      Granted June 12, 1928, to

LOUIS J. COSTA.

It is hereby certified that error appears in the printed specification of the above numbered patent requiring correction as follows: Page 1, line 63, for the word "and" read "end"; page 2, line 73, claim 1, for the misspelled word "comprsing" read "comprising"; and that the said Letters Patent should be read with these corrections therein that the same may conform to the record of the case in the Patent Office.

Signed and sealed this 11th day of December, A. D. 1928.

(Seal)                M. J. Moore,
                 Acting Commissioner of Patents.

bers mounted therein, anti-friction members disposed between said fixed and movable members, a stud formed integrally with said casing for supporting said fixed member, a gear carried by said movable member, means for rotating said gear, a grinder casing, and a worm rotatable therein connected to the movable member of said bearing.

8. Grinding apparatus comprising a casing, a combined end thrust-radial thrust bearing comprising fixed and movable members mounted therein, a gear carried by said movable member, means for rotating said gear, a grinder casing, a worm rotatable therein connected to the movable member of said bearing, and anti-friction structure comprised in said bearing and disposed between said fixed and movable members adapted to receive the end thrust of said worm and radial thrust having as a component the radial thrust of said gear rotating means.

In testimony whereof I have hereunto affixed my signature this 15th day of July, 1925.

LOUIS J. COSTA.

CERTIFICATE OF CORRECTION.

Patent No. 1,673,229.  Granted June 12, 1928, to

LOUIS J. COSTA.

It is hereby certified that error appears in the printed specification of the above numbered patent requiring correction as follows: Page 1, line 63, for the word "and" read "end"; page 2, line 73, claim 1, for the misspelled word "comprsing" read "comprising"; and that the said Letters Patent should be read with these corrections therein that the same may conform to the record of the case in the Patent Office.

Signed and sealed this 11th day of December, A. D. 1928.

(Seal)

M. J. Moore,
Acting Commissioner of Patents.